United States Patent
Hashigaya et al.

(10) Patent No.: US 11,051,540 B2
(45) Date of Patent: Jul. 6, 2021

(54) SIMULATED SHRIMP MEAT FOOD PRODUCT AND PRODUCTION METHOD THEREFOR

(71) Applicant: MARUHA NICHIRO CORPORATION, Tokyo (JP)

(72) Inventors: Wataru Hashigaya, Ibaraki (JP); Naoki Honda, Ibaraki (JP); Mitsuru Hosokawa, Tokyo (JP)

(73) Assignee: MARUHA NICHIRO CORPORATION, Tokyo (JP)

( * ) Notice: Subject to any disclaimer, the term of this patent is extended or adjusted under 35 U.S.C. 154(b) by 340 days.

(21) Appl. No.: 16/084,056

(22) PCT Filed: Mar. 8, 2017

(86) PCT No.: PCT/JP2017/009164
§ 371 (c)(1),
(2) Date: Sep. 11, 2018

(87) PCT Pub. No.: WO2017/183343
PCT Pub. Date: Oct. 26, 2017

(65) Prior Publication Data
US 2020/0297017 A1    Sep. 24, 2020

(30) Foreign Application Priority Data

Apr. 21, 2016 (JP) .............................. JP2016-085553

(51) Int. Cl.
*A23L 29/212* (2016.01)
*A23P 30/10* (2016.01)
*A23L 5/00* (2016.01)
*A23L 33/21* (2016.01)

(52) U.S. Cl.
CPC ............... *A23L 29/212* (2016.08); *A23L 5/55* (2016.08); *A23L 33/21* (2016.08); *A23P 30/10* (2016.08); *A23V 2002/00* (2013.01)

(58) Field of Classification Search
CPC .......... A23L 29/212; A23L 5/55; A23L 33/21; A23P 30/10; A23V 2002/00
USPC ........................................ 426/574, 573, 802
See application file for complete search history.

(56) References Cited

U.S. PATENT DOCUMENTS

| | | | | |
|---|---|---|---|---|
| 3,973,008 | A | * | 8/1976 | Sugiyama ............ A61K 36/888 424/773 |
| 4,652,455 | A | | 3/1987 | Sugino et al. |
| 5,028,445 | A | * | 7/1991 | Wu .......................... A23L 17/40 426/574 |

FOREIGN PATENT DOCUMENTS

| | | | |
|---|---|---|---|
| JP | 60-221063 | | 11/1985 |
| JP | 63-122093 | | 8/1988 |
| JP | 63122093 U | * | 8/1988 |
| JP | 02-308776 | | 12/1990 |
| JP | 07-203873 | | 8/1995 |
| JP | 2014-076041 | | 5/2014 |
| JP | 2015-177754 | | 10/2015 |
| JP | 5874644 B2 | * | 3/2016 |
| WO | WO 2012/081734 | | 6/2012 |
| WO | WO 2015/108142 | | 7/2015 |

OTHER PUBLICATIONS

Translation of JP-5874644-B2 (Year: 2016).*
International Search Report, PCT/JP2017/009164, dated Aug. 15, 2017.
European Search Report, EP 17 78 5686, dated Oct. 16, 2019.

* cited by examiner

*Primary Examiner* — Brent T O'Hern
(74) *Attorney, Agent, or Firm* — Nixon & Vanderhye

(57) ABSTRACT

A shrimp-like food has mannan-containing fibrous portions and a mannan-containing binding portion binding between the fibrous portions. The fibrous portions are preferably arranged in a random orientation in the food. The fibrous portions preferably have a thickness of 0.8 to 3.0 mm. The mannan contents in the fibrous and binding portions are both preferably 1 to 7 mass %.

14 Claims, No Drawings

SIMULATED SHRIMP MEAT FOOD PRODUCT AND PRODUCTION METHOD THEREFOR

TECHNICAL FIELD

This invention relates to a shrimp-like food and a process for producing the same.

BACKGROUND ART

Shrimp are widely eaten because of the characteristic plump texture.

In Japan, cultured shrimp are brought from Southeast Asia to meet the great market demand. However, the price of shrimp has been increasing with the recent increase in global demand.

With respect to foods having a shrimp-like texture, Patent Literature 1 below discloses a prawn-like fish paste prepared by incorporating a freeze-modified mannan gel into surimi (minced fish meat), followed by coagulation by heating.

Patent Literature 2 below discloses a solid preparation containing cellulose and glucomannan that can be mixed with meat, fish, vegetables, and the like and then gelatinized to furnish processed food, such as meat patties. Patent Literature 2 describes in para. [0018] that the preparation is capable of imparting to processed foods favorable textures, such as a ground meat texture, a fluffy texture, a juicy texture, and a smooth texture.

CITATION LIST

Patent Literature

Patent Literature 1: U.S. Pat. No. 4,652,455
Patent Literature 2: JP 2014-76041A

SUMMARY OF INVENTION

The prawn-like fish paste disclosed in Patent Literature 1 is insufficient in the texture characteristic of shrimp or prawn.

The technique disclosed in Patent Literature 2 does not relate to the production of shrimp alternatives and has no mention of imparting a shrimp-like texture.

An object of the invention is to provide a shrimp-like food and a method for producing the shrimp-like food which are capable of eliminating various drawbacks of the conventional techniques.

The present invention provides a shrimp-like food having: fibrous portions which contain a mannan; and a binding portion which contains a mannan and which binds between the fibrous portions.

The invention also provides a method for producing a shrimp-like food including a first step of preparing a fibrous material by dispersing and hydrating a mannan powder in water to prepare a first mannan hydrate, gelatinizing the first mannan hydrate to prepare gelatinized mannan, and subjecting the gelatinized mannan to molding and dehydration simultaneously or successively in any order, a second step for preparing a second mannan hydrate by dispersing and hydrating a mannan powder in water simultaneously with or before or after the first step, a third step of mixing the fibrous material obtained in the first step and the second mannan hydrate obtained in the second step, a fourth step of gelatinizing the second mannan hydrate in the mixture obtained in the third step, and a fifth step of molding the mixture obtained in the fourth step.

DESCRIPTION OF EMBODIMENTS

The shrimp-like food of the invention will be described on the basis of its preferred embodiments.

As used herein, the term "shrimp-like food" means, depending on the context, one imitation shrimp or an aggregate of a plurality of imitation shrimp. The form of the shrimp-like food of the invention may be an imitation of shrimp that a head, legs and shells are deleted. However, the form of the shrimp-like food is not limited thereto, and may be in a minced condition. The shrimp-like food of the invention has a texture like heated shrimp meat.

One of the characteristics of the shrimp-like food of the invention resides in that the binding portion that binds between fibrous portions contains a mannan. A mannan is a type of water-soluble polysaccharide and is capable of containing a solvent in the inside of its polymeric network to swell and form a gel. Usually, the binding portion is preferably a mannan hydrogel.

The inventors have conducted extensive investigations into the constitution of shrimp-like foods with the aim of obtaining a sufficient plump texture unique to shrimp meat. As a result, they have surprisingly found that incorporating a mannan into a binding portion that binds between fibrous portions results in providing the shrimp-like plump texture. Specifically, the binding portion of the invention is a mannan-containing hydrogel. As will be seen from Comparative Example 1 described later, when the binding portion that binds between modified mannan gel portions is formed of surimi, the resulting food product provides a flaky texture like imitation crab meat but no plump texture.

The mannan that makes up the binding portion is a water soluble polysaccharide mainly composed of mannose. Sources of useful mannans include plants and microorganisms. Microorganisms as a mannan source include yeasts. Plants as a mannan source include red algae, orchidaceous plants, konjac plant, lilies, narcissuses, spider lilies, and beans. Many of these plants produce mannan in the rhizomes or root tubers. Examples of useful mannans include glucomannan and galactomannan.

Glucomannan is a straight-chain polymer, usually with no branching nor modification, composed of $\beta$-(1-4)-linked glucose and mannose in a ratio of approximately 2:3, and abundantly found in cell walls of conifer wood or konjac root. Galactomannan is composed of a mannose backbone ((1-4)-linked $\beta$-D-mannopyranose) with $\alpha$-(1-6)-linked galactose ($\alpha$-D-galactopyranose), including locust bean gum and guar gum. These mannan species may be used either individually or in combination of two or more thereof. In particular, it is preferred to use mannans capable of forming a gel that does not dissolve even when heated. Such mannans include glucomannan. A gel that does not dissolve even when heated is obtained from glucomannan by adjusting the pH of water-swollen glucomannan to an alkaline range.

It is preferred for the binding portion to have a mannan content of 1 mass % or more in view of making a binding portion with a moderate firmness thereby easily providing a shrimp-like texture and with consideration of production suitability. When the binding portion has a mannan content of 7 mass % or less, a shrimp-like plump texture is obtained easily. From these considerations, the mannan content in the binding portion is preferably 1 to 7 mass %, more preferably 2 to 5 mass %.

The mannan content in the binder portion of the shrimp-like food can be determined as follows.

Because the main component of a mannan is dietary fiber, the mannan content may be estimated by the determination of dietary fiber. In the invention the dietary fiber content is measured by the Prosky method according to the following procedures. The binding portion is dissolved in a phosphoric acid buffer solution, treated with thermostable amylase (pH 6.0, 30 min, 95° C.), then treated with protease (pH 7.5, 30 min, 60° C.) to digest the protein into low-molecular polypeptides or amino acids, and finally treated with amyloglucosidase (pH 4.5, 30 min, 60° C.). Four times the volume of ethanol is added to the resulting solution, and the thus formed precipitate is collected by filtration, washed successively with ethanol and acetone. The undigested lipid is removed by washing with acetone. The residue is dried overnight and weighed, and the masses of the separately determined protein and ash are subtracted from the mass of the dried residue to give the dietary fiber content.

It is preferred for the binding portion to further contain starch with a view to moderately reducing the springiness or elasticity of the binding portion thereby to provide a shrimp-like food with not only a plump texture but a tender texture characteristic of fresh shrimp meat. Examples of useful starches include native starches such as potato starch, corn starch, tapioca starch, wheat starch, sweet potato starch, sago palm starch, cassava starch, kudzu starch, Asian fawn-lily (Japanese dog tooth violet) starch, broad bean starch, mung bean starch, kidney bean starch, adzuki bean starch, and rice starch; enzyme-treated starches obtained by treating these native starches with amylase or a like enzyme; and modified starches prepared by treating these native starches by, for example, one or more of pregelatinization, decomposition, etherification, esterification, crosslinking, grafting, and the like. Pregelatinization, for example, is effected by heating native starch and rapidly drying the gelatinized starch while hot. The starch for use in the binding portion is preferably pregelatinized starch or hydroxypropylated, highly crosslinked starch.

The content of starch in the binding portion of the shrimp-like food is preferably 1 mass % or more with a view to making the texture of the shrimp-like food even more shrimp-like. The upper limit of the starch content in the binding portion is preferably 10 mass % with a view to maintaining the shrimp-like plump texture. From these considerations, the starch content in the binding portion is preferably 1 to 10 mass %, more preferably 3 to 6 mass %.

The starch content in the shrimp-like food can be determined by completely hydrolyzing and solubilizing a sample by the addition of α-amylase, completely decomposing the resulting hydrolysate into glucose using amyloglucosidase, and determining the amount of glucose by absorbance determination to calculate the total starch content of the sample.

The water content of the binding portion is preferably 75 mass % or more with a view to developing a sufficient plump texture of shrimp meat and providing a good appearance characteristic of juicy shrimp. The water content of the binding portion is preferably 98 mass % or less in terms of ease of forming the binding portion, prevention of water release from the products, and ease of obtaining a texture like shrimp meat. From these considerations, the water content of the binding portion is preferably 75 to 98 mass %, more preferably 80 to 90 mass %. The water content can be determined by, for example, the method adopted in Examples described later. Shrimp-like foods the binding portion of which has a water content within the above range may be produced by, for example, a preferred method hereinafter described.

The binding portion is in the form of a gel, having been coagulated with a large number of fibrous portions embedded therein such that it binds between the fibrous portions. As will be described later, it is preferred in the invention that a plurality of fibrous portions be embedded in the binding portion in a random orientation. When the fibrous portions are oriented in random directions, the binding portion can be present between lateral sides of fibrous portions to interlink them, between longitudinal ends of fibrous portions to interconnect them, or between a longitudinal end of a fibrous portion and a lateral side of another fibrous portion to connect them. The binding portion usually takes on a gel state having no definite shape as a result of coagulation with fibrous portions embedded therein. Accordingly, the binding portion does not have a fibrous form.

In the invention, the fibrous portion also contains a mannan. The mannan used in the fibrous portion may be the same as that used in the binding portion.

The fibrous portion is preferably a mannan hydrogel similarly to the binding portion. It is more preferred that the fibrous portion be formed as a result of dehydration modification of a mannan hydrogel. The term "dehydration modification" as used herein refers to, for example, modification by dehydration accompanying freezing or heating. The dehydration modification of a mannan gel by freezing, for example, is considered to be a phenomenon where water swells upon being frozen to create compressed portions spaced away from one another in the mannan fiber molecules and then releases upon thawing. The dehydration-modified mannan gel is more springy than before the modification, thereby providing a texture like shrimp fiber. Unlike the fibrous portions, it is preferred for the binding portion binding between fibrous portions not to be a dehydration modified mannan gel so as to ensure the plump texture of the shrimp-like food of the present embodiment.

As a result of the dehydration modification, the water content of the fibrous portion is preferably lower than that of the binding portion. Nevertheless, the water content of the fibrous portion may be equal to that of the binding portion as a result of migration or adhesion of the water content of the surrounding binding portion after dehydration modification. The term "equal" is used herein to mean that, even when the fibrous portion has a higher water content than the binding portion, the difference of water content between the fibrous portion and the binding portion is not more than 5 mass %, preferably 3 mass % or smaller, more preferably 1 mass % o less. The water content of the fibrous portion can be measured by the method described in Examples given later.

The water content of the fibrous portion is preferably 95 mass % or less to provide a sufficient fibrous texture of shrimp. The water content of the fibrous portion is preferably 75 mass % or more in the interests of each of making and texture. From these considerations, the water content of the fibrous portion is preferably 75 to 95 mass %, more preferably 80 to 93 mass %. The shrimp-like food of which the fibrous portion has a water content within the above range can be obtained by, for example, the preferred method described later.

It is preferred for the fibrous portion to have a mannan content of 1 mass % or more in view of ease of gelatinization, ease in obtaining a fibrous texture, production suitability, and prevention of excessive release of water that would reduce the yield. From the viewpoint of obtaining a shrimp-like texture, It is preferred for the fibrous portion to have a mannan content of 7 mass % or less. From these considerations, the mannan content of the fibrous portion is preferably 1 to 7 mass %, more preferably 2 to 5 mass %. The mannan content of the fibrous portion can be determined in the same manner as for the determination of the mannan content of the binding portion.

While the fibrous portion may or may not contain starch, it is preferred for the fibrous portion to contain starch so that the fibrous portion may have restricted springiness to provide a good bite. The starch that may be incorporated into the fibrous portion may be chosen from those for the binding portion.

Specifically, the starch content in the fibrous portion is preferably 1 mass % or more so that the fibrous portion may have moderate springiness like shrimp meat fiber. To make a clear difference in texture from the binding portion, the starch content of the fibrous portion is preferably 10 mass % or less. From these considerations, the starch content of the fibrous portion is preferably in the range of from 1 to 10 mass %, more preferably from 2 to 6 mass %. The starch content in the fibrous portion can be determined in the same manner as for the starch content of the binding portion.

It is also recommended for the fibrous portion to contain a combination of modified starch and native starch, especially a combination of pregelatinized starch and non-pregelatinized starch. When pregelatinized starch and non-pregelatinized starch are used in combination, the ratio of the non-pregelatinized starch to 100 parts by mass of the pregelatinized starch is preferably 50 to 300 parts by mass, more preferably 100 to 200 parts by mass. With the view of obtaining pleasant firmness in bite, preferred examples of non-pregelatinized starch to be combined with pregelatinized starch include mung bean starch, kidney bean starch, potato starch, tapioca starch, corn starch, and waxy corn starch.

The fibrous portion may have an oblong shape having a high ratio of the length L3 in the longitudinal direction to the major dimension L2 of a cross-section perpendicular to the longitudinal direction, L3/L2. Such an oblong shape can be a thread-like, rope-like, or rod-like shape. In the shrimp-like food of the embodiment, it is the fibrous portions that the binding portion binds together, and the binding portion contains a mannan to provide a plump texture. Owing to this constitution, the shrimp-like food of the embodiment has both a plump texture and a fibrous texture unique to shrimp meat. In contrast, as will be turned out in Comparative Example 2 given later, if a freeze-modified mannan gel is shaped into a flattened, plate-like shape as described in Patent Literature 1, the resulting product fails to provide a fibrous texture unique to shrimp meat.

The ratio of the length L3 of the fibrous portion in the longitudinal direction to the major dimension L2 of a cross-section perpendicular to the longitudinal direction, the L3/L2, is preferably 3.00 or greater for obtaining a sufficient fibrous texture. The L3/L2 is preferably 50.00 or smaller because, when the fibrous portions are randomly distributed in the food as will be discussed below, the fibrous texture of the shrimp-like food is more perceptible to the tongue.

As used herein, the term "major dimension (L2)" denotes the length of a side when the cross-section is a square, the length of a longer side when the cross-section is an oblong rectangle, or, when otherwise shaped, the length of the longest segment connecting two points on the perimeter of the cross-section. From the viewpoint discussed above, the L3/L2 is more preferably 5.00 to 20.00. In order to sufficiently enhancing the shrimp-like fibrous texture, the length L3 of the fibrous portion is preferably 5 to 40 mm, more preferably 10 to 20 mm.

From the viewpoint discussed above, the fibrous portion preferably has a small aspect ratio in a cross-section taken perpendicular to the longitudinal direction. The term "aspect ratio" as used herein refers to a ratio of the major dimension L2 to the minor dimension L1 of the cross-section, L2/L1. As used herein, the term "minor dimension (L1)" refers to the length of the shorter side when the cross-section is an oblong rectangle or, when otherwise shaped, the breadth in the direction perpendicular to the major length direction. The minor dimension L1 will sometimes be called the thickness of the fibrous portion. In order to improve the fibrous texture of the shrimp-like food, the aspect ratio, L2/L1, of the cross-section is preferably 3.75 or smaller, more preferably 2.00 or smaller. The lower limit of the aspect ratio of the cross-section is 1.

The minor dimension L1 (thickness of the fibrous portion) is preferably 0.8 mm or greater for easily providing a sufficient fibrous texture of shrimp meat and preferably 3.0 mm or smaller for ease of maintaining the difference in texture from the binding portion. From these considerations, the minor dimension L1 (thickness of the fibrous portion) is more preferably 0.8 to 3.0 mm, even more preferably 1.0 to 2.0 mm From the same viewpoint, the major dimension L2 is preferably 0.8 to 30 mm, more preferably 1.0 to 2.0 mm.

The above described ranges of the minor dimension L1 (thickness of the fibrous portion), major dimension L2, and the length L3 (dimension in the longitudinal direction) are preferred particularly when the shrimp-like food is an imitation of small shrimp, such as white-leg shrimp, specifically when the shrimp-like food has a length of 10 to 120 mm in the longitudinal direction. When a shrimp-like food is not straight linear but curved or bent, the term "length" of a shrimp-like food refers to the length measured along the curve or bent from end to end.

The major dimension L2, minor dimension L1 (thickness), and aspect ratio (L2/L1) of the fibrous portion are preferably measured on a microscopic image of a cross-section of a shrimp-like food. A binocular stereo microscope may be used for the microscopic observation. The magnification is preferably 10 to 30 times, more preferably 10 to 20 times.

The length L3 of the fibrous portion in the longitudinal direction is obtained by disintegrating the shrimp-like food using tweezers or other means to separate a fibrous portion and measuring the length of the fibrous portion using a vernier caliper. When the fibrous portion is curved or bent, the length L3 is measured along the curve or bent from end to end.

The condition that the major dimension L2, minor dimension L1, and aspect ratio L2/L1 of a shrimp-like food fall within the respective ranges described is satisfied when a single cross-section of a single shrimp-like food satisfies the condition. Likewise, the condition that the L3/L2 falls within the above range is satisfied when a single cross-section of a single shrimp-like food satisfies the condition.

Nonetheless, with respect to L2 and L1, it is more preferred that these dimensions fall within the respective ranges in a plurality of (preferably 10 or more, more preferably 29 or more) cross-sections of a single fibrous portion taken perpendicular to the longitudinal direction. With respect to the L3/L2, when the cross-sectional shape of the fibrous portion taken perpendicular to the longitudinal direction varies along the longitudinal direction, it is more preferred that the ratio of L3 to the longest major dimension L2 of a plurality of cross-sections perpendicular to the longitudinal direction, (L3/L2)', be within the above preferred range of the L3/L2, provided that the fibrous portion has no branches. When the fibrous portion is branched, it is more preferred that the ratio of L3 to the longest major dimension L2 of a plurality of cross-sections taken perpendicular to the longitudinal direction at anywhere except the branches, (L3/L2)", be within the preferred range of the L3/L2. The branch may be a projection from the lateral side of the fibrous portion projecting in a direction different from the longitudinal direction of the fibrous portion, the length of the root of the projection in the longitudinal direction of the fibrous portion being 90% or less of the entire length of the fibrous portion. However, it is preferred for the fibrous portion to have no such branches. When the cross-sectional shape of the fibrous portion perpendicular to the longitudinal direction varies along the longitudinal direction, it is also preferred that the greatest aspect ratio (L2/L1)' of a plurality of cross-sections perpendicular to the longitudinal direction of the fibrous portion be within the above range of L2/L1. In the case where the shrimp-like food is an aggregate of a plurality of imitation shrimp, the condition that the major dimension L2, minor dimension L1, and aspect ratio L2/L1 or (L2/L1)', and the ratio L3/L2, (L3/L2)', or (L3/L2)" of the fibrous portion fall within the respective preferred ranges described above is satisfied when a single imitation shrimp out of the aggregate satisfies the condition.

The fibrous portions may be arranged in the shrimp-like food of the embodiment in either a parallel or a random orientation. A random orientation of the fibrous portions provides a shrimp-like food that is more analogous to shrimp in both appearance and texture. For example, the sensation of unevenness of the food surface and the sensation of the food falling apart when bitten (flaky texture) are more pleasant when the fibrous portions in the shrimp-like food are arranged in a random orientation than in a parallel orientation.

The mass ratio between the fibrous portions and the binder portion in the shrimp-like food, the former:the latter is preferably 100:42 or greater in view of obtaining a shrimp-like plump texture and production suitability and preferably 100:150 or smaller in view of maintaining the fibrous texture characteristic of shrimp meat. From these considerations, the mass ratio between the fibrous portions and the binding portion in the shrimp-like food, the former: the later, is preferably 100:42 to 150, more preferably 100:66 to 100. The mass of the fibrous portions in the shrimp-like food can be determined by separating the fibrous portions off the binding portion using tweezers or other means and weighing the separated fibrous portions. The mass of the binding portion is obtained by subtracting the mass of the fibrous portions from the total mass of the shrimp-like food.

A preferred method for producing the shrimp-like food of the embodiment will then be described. The method includes:

a first step of preparing a fibrous material by dispersing and hydrating a mannan powder in water to prepare a first mannan hydrate, gelatinizing the first mannan hydrate to form a gelatinized mannan, and subjecting the gelatinized mannan to molding and dehydration simultaneously or successively in any order;

a second step for obtaining a second mannan hydrate by dispersing and hydrating a mannan powder in water simultaneously with or before or after the first step;

a third step of mixing the fibrous material obtained in the first step and the second mannan hydrate obtained in the second step;

a fourth step of gelatinizing the second mannan hydrate in the mixture obtained in the third step; and a fifth step of molding the mixture obtained in the fourth step.

Step 1:

The mannan powder to be used may be selected with no limitation from, for example, powdered, mannan-containing plant extracts, such as konjac mannan powder, and purified products prepared from the mannan-containing plant extracts. The mannan powder is preferably easy to dissolve in water. In step 1, such a mannan-containing raw material containing a mannan powder is dispersed in water to hydrate the mannan of the raw material. With a view to making a fibrous portion with favorable physical properties, the mannan in the mannan powder preferably has an average molecular weight of 200,000 to 2,000,000, more preferably 1,000,000 to 2,000,000. The average molecular weight as referred to here is a weight average molecular weight and can be determined by gel permeation chromatography (GPC). It is preferred for the mannan-containing raw material to contain the aforementioned starch. After dispersed in water, the mannan powder-containing raw material is let swell to hydrate the mannan, thereby to give a first mannan hydrate. The amount of water to be used for hydration is preferably 4000 to 4900 parts by mass, more preferably 4300 to 4800 parts by mass, per 100 parts by mass of the mannan contained in the mannan-containing raw material.

The resulting first mannan hydrate is gelatinized by, for example, adding an alkali agent. Examples of suitable alkali agents include calcium hydroxide, sodium carbonate, sodium hydroxide, potassium carbonate, trisodium phosphate, tripotassium phosphate, and calcined calcium. The amount of the alkali agent to be added is preferably 5.0 to 10.0 parts by mass per 100 parts by mass of the mannan in the mannan-containing raw material with the view of improving the taste and texture of the shrimp-like food of the invention. The resulting gelatinized mannan is steamed, boiled, or otherwise heated at 70° to 100° C. to sufficiently coagulate the gel. The resulting gelatinized mannan is molded and dehydrated.

It is desirable in terms of production efficiency that the gelatinized mannan be first molded while soft into a given shape, then heated to coagulate, and molded again. The molding may be carried out by any method, including extrusion, rolling, blanking, and trimming. When the gelatinized mannan is molded by extrusion or a like technique, it is preferred that the gelatinized mannan be passed through hot water simultaneously with the molding thereby to accelerate coagulation. The dehydration is a process for removing water molecules from the gel and is effected by, for example, heating or freezing. The heat treatment is preferably performed in an oxygen atmosphere at 180° to 300° C. with the view of efficiently forming shrimp meat-like fiber and providing a desired texture. The heating temperature being in that range, the heating time is preferably 3 to 30 minutes. With the same view, the freezing treatment is preferably carried out at −60° to −1° C., more preferably −18° C. or lower. The freezing temperature being in that range, the freezing time is preferably 20 minutes or longer.

The molding and the dehydration may be conducted simultaneously or successively in any order. When the molding and the dehydration are conducted successively, it is preferred that the dehydration be preceded by the molding so that both the dehydration and the molding may be achieved more efficiently. In a preferred embodiment, for example, the molding and the dehydration can be performed more efficiently by molding the gelatinized mannan into an elongated shape with the same cross-sectional contour as that of a desired fibrous material and then dehydrating the molded gelatinized mannan, followed by cutting to predetermined length. A fibrous material is thus obtained in step 1. The resulting fibrous material corresponds to the fibrous portions of a finally prepared shrimp-like food.

Step 2:

The mannan powder for use in step 2 may be the same as that used in step 1. Similarly to step 1, a mannan-containing raw material containing a mannan powder is dispersed in water to hydrate the mannan of the raw material. In order to establish the physical properties favorable as a binding portion, the mannan-containing raw material preferably contains starch, particularly modified starch. In this step, the mannan-containing raw material is dispersed in water and let swell appropriately to be hydrated. The amount of water to be used for hydration is preferably 4000 to 4900 parts by mass, more preferably 4300 to 4800 parts by mass, per 100 parts by mass of the mannan in the mannan-containing raw material. A second mannan hydrate is thus obtained.

Steps 3 and 4:

In step 3, the fibrous material prepared in step 1 and the second mannan hydrate prepared in step 2 are mixed. In step 4, the second mannan hydrate in the mixture obtained in step 3 is gelatinized. The gelatinization can be conducted by the addition of an alkali agent to the mixture. The alkali agent may be the same as that used in step 1. The amount of the alkali agent to be added is preferably 5.0 to 10.0 parts by mass per 100 parts by mass of the mannan in the mannan powder-containing raw material used in step 2 with the view of imparting more pleasant taste and texture to the resulting shrimp-like food. After the addition of the alkali agent, it is usually preferred that the mixture is preferably heated at 70° to 100° C. to sufficiently coagulate the gel. The heating may be steaming, boiling and so on.

Step 5:

In step 5, the mixture obtained in step 4 is molded. The molding may be carried out by any method selected according to the form of a desired shrimp-like food, such as extrusion through a nozzle, blanking, or trimming. The heating for gelatinization may be conducted after the step of molding. In step 5, the molding is preferably followed by coloring and seasoning. The seasoning is conducted for giving a shrimp-like flavor to the binding and fibrous portions. Examples of useful seasoning agents include sodium glutamate, sugar, common salt, sodium 5'-ribonucleotide, protein hydrolysates, glycine, scallop extract, shrimp extract, and shrimp flavor. If desired, the product may be baked for the purpose of fixing the color and flavor, preventing water release, and enhancing the texture. The baking can be carried out in an oxygen atmosphere at 100° to 300° C.

The shrimp-like food prepared by the above procedures can be an imitation of various kinds of shrimp, such as white leg shrimp, black tiger prawn, Japanese fan lobster, Shiba shrimp, Japanese spiny lobster, Japanese tiger prawn, American lobster, pink shrimp species, brown shrimp species, karikadi shrimp, and poovalan shrimp. The shrimp-like food of the invention provides both the plump texture and the fibrous texture unique to shrimp meat and may be served as such or used as a material for making various processed foods, such as frozen foods, microwavable foods, diet foods, deep-fired foods, and chilled foods.

EXAMPLES

The invention will now be illustrated in greater detail with reference to Examples, but it should be understood that the invention is not construed as being limited thereto. Unless otherwise noted, all the percentages are by mass.

Example 1

Step 1:

Two grams of glucomannan powder (average molecular weight: 2,000,000), 3 g of pregelatinized starch, 3 g of mung bean starch, 3 g of trehalose, and 89 g of water were mixed by stirring and allowed to stand at 5° C. for 5 hours to swell and hydrate the glucomannan. The resulting hydration product was mixed with 0.2 g of calcium hydroxide and 10 g of water to give a gelatinized mannan. The resulting gelatinized mannan was extruded through 1 mm-diameter circular nozzles into hot water at 80° C. The molded product was boiled at 80° to 90° C. for 5 minutes, followed by freezing in a freezer kept at −40° C. for 1 hour for dehydration. The frozen product was thawed in water, disintegrated, and drained. Thereafter, the product was cut to about 10 mm length to provide a fibrous material.

Step 2:

Two grams of glucomannan powder (average molecular weight: 2,000,000), 6 g of pregelatinized starch, and 92 g of water were mixed by stirring and allowed to stand at 5° C. for 5 hours to swell and hydrate the glucomannan to give a mannan hydrate.

Steps 3 to 5:

Sixty grams of the fibrous material obtained in step 1 and 40 g of the mannan hydrate obtained in step 2 were mixed, and 0.08 g of calcium hydroxide and 4.0 g of water were added thereto thereby to gelatinize the mannan hydrate of the mixture. The gelatinized mixture was extruded through nozzles having a circular opening (opening diameter: 8 mm) and cut to 10 mm length along an extruding direction. The cut pieces were boiled at 80° C. for 10 minutes. After draining, the pieces were colored with a coloring agent and immersed in a seasoning liquid (a mixture of 100 g of water, 2 g of sugar, 1.3 g of amino acids and so on, 1 g of common salt, 0.8 g of scallop extract, and 0.2 g of a flavoring agent), followed by draining to give a shrimp-like food. The resulting shrimp-like food was disintegrated using tweezers into a fibrous and a binding portion. The water content of each of the fibrous and the binding portion was determined from the difference in mass before and after heating using a heat dryer. The water contents of the fibrous and the binding portion were found to be 91.41% and 92.56%, respectively. The composition of the fibrous portion was calculated from the weight of the fibrous portion and the amounts of the starch and mannan used in the preparation to find that the starch content and the mannan content of the fibrous portion were 6% and 2%, respectively. The composition of the binding portion was calculated from the weight of the binding portion, which was obtained as a difference between the weight of the food and the weight of the fibrous portion, and the amounts of the starch and mannan used in the preparation to find that the starch content and the mannan content of the binding portion were 6% and 2%, respectively.

The fibrous portion separated from the shrimp-like food was observed under a binocular stereo microscope at a magnification of 10 times to measure the minor dimension (thickness) L1 and the major dimension L2. The length L3 of the fibrous portion was measured using a vernier caliper. As a result, the L1 and L2 were both 1.2 mm, giving an aspect ratio (L2/L1) of 1, and the L3/L2 was 8.3. The L1 and L2 of the fibrous portion were substantially constant in the longitudinal direction.

Example 2

Step 1:
Two grams of glucomannan powder (average molecular weight: 2,000,000), 3 g of pregelatinized starch, 3 g of mung bean starch, 3 g of trehalose, and 89 g of water were mixed by stirring and allowed to stand at 5° C. for 5 hours to swell and hydrate the glucomannan. The resulting hydration product was mixed with 0.2 g of calcium hydroxide and 10 g of water to give a gelatinized mannan. The resulting gelatinized mannan was rolled out to a thickness of 1 mm using a rolling machine and steamed at 100° C. for 10 minutes. The resulting gel of sheet form was sliced into square bars with a width of 1.0 to 1.5 mm. The thus shaped product was frozen in a freezer kept at −40° C. for 1 hour for dehydration. The frozen product was thawed, disintegrated in water, and drained. Thereafter, the bar was cut to about 10 mm length to provide a fibrous material.

Step 2:
Two grams of glucomannan powder (average molecular weight: 2,000,000), 6 g of pregelatinized starch, and 92 g of water were mixed by stirring and allowed to stand at 5° C. for 5 hours to swell and hydrate the glucomannan to give a mannan hydrate.

Steps 3 to 5:
Sixty grams of the fibrous material obtained in step 1 and 40 g of the mannan hydrate obtained in step 2 were mixed, and 0.08 g of calcium hydroxide and 4.0 g of water were added thereto thereby to gelatinize the mannan hydrate of the mixture. After the gelatinization, the mixture was extruded through nozzles having a circular opening (opening diameter: 8 mm) and cut to 10 mm length along an extruding direction. The cut pieces were colored with a coloring agent, baked at 250° C. for 5 minutes, and seasoned by immersing in a seasoning liquid (a mixture of 100 g of water, 2 g of sugar, 1.3 g of amino acids and so on, 1 g of common salt, 0.8 g of scallop extract, and 0.2 g of a flavoring agent) to give a shrimp-like food.

The resulting shrimp-like food was disintegrated using tweezers into a fibrous and a binding portion. The water content of each of the fibrous and binding portions was determined from the difference in mass before and after heating using a heat dryer. As a result, the water contents of the fibrous portion and the binding portion were found to be 81.5% and 83.3%, respectively. The composition of the fibrous portion was calculated from the weight of the fibrous portion and the amounts of the starch and mannan used in the preparation to find that the starch content and the mannan content of the fibrous portion were 6% and 2%, respectively. The composition of the binding portion was calculated from the weight of the binding portion, which was obtained as a difference between the weight of the food and the weight of the fibrous portion, and the amounts of the starch and mannan used in the preparation to find that the starch content and the mannan content of the binding portion were 6% and 2%, respectively.

The fibrous portion separated from the shrimp-like food was observed under a binocular stereo microscope at a magnification of 10 times to measure the minor dimension (thickness) L1 and the major dimension L2. The length L3 of the fibrous portion was measured using a vernier caliper. As a result, the L1 was 1.0 mm and the L2 was 1.5 mm, giving an aspect ratio (L2/L1) of 1.5, and the L3/L2 was 6.67.

Comparative Example 1

Comparative Example 1 provides a comparative product obtained by heat-coagulating a mixture of fish paste and a modified mannan according to the disclosure of Patent Literature 1.

Instead of step 2 of Example 1, 1 kg of A grade surimi was well ground together with 0.3 kg of ice water and 25 g of common salt. The mixture was kneaded while adding 10 g of a seasoning (shrimp extract), 60 g of starch, and 1 g of a texturing agent (a condensed phosphate) to prepare a fish paste. Sixty grams of the fibrous material prepared in step 1 of Example 1 and 40 g of the resulting fish paste were mixed. The mixture was extruded and cut in the same manner as in Example 1 and boiled at 90° to 100° C. for 30 minutes to make a comparative shrimp-like food.

Comparative Example 2

Comparative Example 2 represents use of a modified mannan that is not fibrous but flattened as in Patent Literature 1.

A comparative shrimp-like food was made in the same manner as in Example 2, except that the gelatinized mannan rolled out into a sheet form in step 1 was sliced into 3-cm wide and 2 mm-thick strips, which were frozen and cut to 3 cm length.

Evaluation:
A panel consisting of randomly chosen 12 adult members (8 males and 4 females; average age: 41) was asked to eat the shrimp-like food samples prepared in Examples 1 and 2 and Comparative Examples 1 and 2 and evaluate in terms of items A to D below according to the scoring system below in comparison with cooked white-leg shrimp prepared by immersing in a 2% phosphate solution for 2 hours, followed by boiling. A sample given a total score of 49 or higher was rated "AA"; 37 or higher and lower than 49, "A"; 25 or higher and lower than 37, "B"; 13 or higher and lower than 25, "C"; and 0 or higher and lower than 13, "D". The results obtained are shown in Table 1.

Evaluation Items:
A: Shrimp-like plump texture
B: Shrimp-like fibrous texture
C: Overall balance of texture
D: Cross-sectional appearance Scale for Scoring:
5: Very equal to real shrimp.
4: Very similar to real shrimp.
3: Slightly different from, but similar to real shrimp.
2: Different from, but similar in part to real shrimp.
1: Different from, but a little similar to real shrimp.
0: Very different from real shrimp.

TABLE 1

|  | A (plump texture) | B (fibrous texture) | C (overall texture) | D (appearance) |
|---|---|---|---|---|
| Example 1 | A | A | A | A |
| Example 2 | B | B | A | B |

TABLE 1-continued

|  | A (plump texture) | B (fibrous texture) | C (overall texture) | D (appearance) |
|---|---|---|---|---|
| Comp. Example 1 | C | D | D | D |
| Compara. Example 2 | D | C | C | C |

It is seen from the results in Table 1 that the shrimp-like foods made up of mannan-containing fibrous portions and a mannan-containing binding portion are superior in textures characteristic of shrimp, especially a plump texture, to the food of Comparative Example 1 in which the binding portion is formed of a fish paste and the food of Comparative Example 2 in which strip portions are used in place of fibrous portions.

Example 3

Deep-fried shrimp meat was prepared using the shrimp-like food of Example 1 as follows.

Surimi of golden thread-fin bream was kneaded together with added common salt. Water, starch, egg white, and seasoning agents were added thereto, followed by further kneading. A hundred parts by mass of the thus prepared seasoned surimi was mixed with 112 parts by mass of the shrimp-like food obtained in Example 1. A 15 g portion of the resulting pasty material was pulled into shape, coated with a batter, breaded, and cooked to prepare a deep-fried shrimp-like food weighing 30 g.

Evaluation:

A panel consisting of randomly chosen 18 adult members (all male; average age: 38) was asked to eat the deep-fried shrimp-like food prepared in Example 3 and evaluate in terms of items A to C below according to the scoring system below in comparison with deep-fried white-leg shrimp. Table 2 below shows the number (abbreviated as N) and ratio (abbreviated as R) of panel members who gave the score shown.

Evaluation Item:
A: Texture in comparison with the food using real shrimp.
B: Taste in comparison with the food using real shrimp.
C: Appearance in comparison with the food using real shrimp.

Scale for Scoring:
5: Very equal to real shrimp.
4: Slightly different from, but very similar to real shrimp.
3: Different from, but similar in part to real shrimp.
2: Different from, but a little similar to real shrimp.
1: Very different from real shrimp.

TABLE 2

|  | Score 5 | | Score 4 | | Score 3 | | Score 2 | | Score 1 | |
|---|---|---|---|---|---|---|---|---|---|---|
| Item | N | R (%) | N | R (%) | N | R (%) | N | R (%) | N | R (%) |
| A (texture) | 2 | 11.1 | 10 | 55.6 | 5 | 27.8 | 1 | 5.6 | 0 | 0.0 |
| B (taste) | 1 | 5.6 | 9 | 50.0 | 6 | 33.3 | 2 | 11.1 | 0 | 0.0 |
| C (appearance) | 2 | 11.1 | 8 | 44.4 | 5 | 27.8 | 3 | 16.7 | 0 | 0.0 |

The tasting results in Table 2 prove that the shrimp-like food comprising a mannan-containing fibrous portion and a mannan-containing binding portion bears a strong resemblance to real shrimp in texture, taste, and appearance and can be an excellent substitute for shrimp.

Example 4

Step 1:

Two grams of glucomannan powder (average molecular weight: 2,000,000) and 98 g of water were by stirring and allowed to stand at 5° C. for 5 hours to swell and hydrate the glucomannan. The resulting hydration product was mixed with 0.2 g of calcium hydroxide and 10 g of water to give a gelatinized mannan. The gelatinized mannan was extruded through 1 mm-diameter circular nozzles into hot water at 80° C. The molded product was boiled at 80° to 90° C. for 5 minutes, followed by freezing in a freezer kept at −40° C. for 1 hour for dehydration. The frozen product was thawed in water, disintegrated, and drained. Thereafter, the product was cut to about 10 mm length to provide a fibrous material.

Step 2:

Two grams of glucomannan powder (average molecular weight: 2,000,000), 6 g of pregelatinized starch, and 92 g of water were mixed by stirring and allowed to stand at 5° C. for 5 hours to swell and hydrate the glucomannan to give a mannan hydrate.

Steps 3 to 5:

Sixty grams of the fibrous material obtained in step 1 and 40 g of the mannan hydrate obtained in step 2 were mixed, and 0.08 g of calcium hydroxide and 4 g of water were added thereto thereby to gelatinize the mannan hydrate of the mixture. The gelatinized mixture was extruded through nozzles having a circular opening (opening diameter: 8 mm) and cut to 10 mm length along an extruding direction. The cut pieces were boiled at 80° C. for 10 minutes. After draining, the pieces were colored with a coloring agent and immersed in a seasoning liquid (a mixture of 100 g of water, 2 g of sugar, 1.3 g of amino acids and so on, 1 g of common salt, 0.8 g of scallop extract, and 0.2 g of a flavoring agent), followed by draining to give a shrimp-like food.

The fibrous portion separated from the shrimp-like food was observed under a binocular stereo microscope at a magnification of 10 times to measure the minor dimension (thickness) L1 and the major dimension L2. The length L3 of the fibrous portion was measured using a vernier caliper. As a result, the L1 and L2 were both 0.8 mm, giving an aspect ratio (L2/L1) of 1, and the L3/L2 was 12.5.

Results of Tasting:

The amount of water released after thawing increased because of the absence of starch in the fibrous portion, resulting in a hard texture. However, the shrimp-like texture was retained by combining the fibrous portion with a binding portion containing starch. When evaluated by voluntary tasters, the shrimp-like food of Example 4 was so fibrous in the mouth as to feel different from real shrimp as compared with the products of Examples 1 and 2 but was judged to be safely useful as a bulking agent as in Example 3.

The above tasting results prove that the shrimp-like food of the invention is sufficient for use as a substitute for shrimp or shrimp meat even when its fibrous portion contains no starch.

INDUSTRIAL APPLICABILITY

The shrimp-like food of the invention is made from inexpensive raw materials, yet excellent in providing the texture unique to shrimp meat, and useful as a substitute for shrimp. Made mainly of a mannan, the shrimp-like food of the invention has the advantage of low calorie. The method of the invention is industrially advantageous for the preparation of the shrimp-like food of the invention.

The invention claimed is:

1. A shrimp-like food comprising: fibrous portions which contain a mannan; and a binding portion which contains a mannan and which binds between the fibrous portions; wherein the fibrous portions are arranged in the food in a random orientation; and wherein the binding portion further contains starch, and the fibrous portions do not contain starch.

2. The shrimp-like food according to claim 1, wherein individual fibrous portions have a thickness of 0.8 to 3.0 mm.

3. The shrimp-like food according to claim 1, wherein the fibrous portions have a mannan content of 1 to 7 mass %, and the binding portion has a mannan content of 1 to 7 mass %.

4. The shrimp-like food according to claim 1, wherein the mass ratio of the fibrous portions to the binding portion in the food is 100:42 to 150.

5. The shrimp-like food according to claim 1, wherein the fibrous portions have a water content equal to or lower than that of the binding portion.

6. The shrimp-like food according to claim 5, wherein the water content of the fibrous portions is 75 to 95 mass %, and the water content of the binding portion is 75 to 98 mass %.

7. The shrimp-like food according to claim 2, wherein the fibrous portions have a mannan content of 1 to 7 mass %, and the binding portion has a mannan content of 1 to 7 mass %.

8. The shrimp-like food according to claim 2, wherein the mass ratio of the fibrous portions to the binding portion in the food is 100:42 to 150.

9. The shrimp-like food according to claim 3, wherein the mass ratio of the fibrous portions to the binding portion in the food is 100:42 to 150.

10. A shrimp-like food comprising: fibrous portions which contain a mannan; and a binding portion which contains a mannan and which binds between the fibrous portions; wherein the fibrous portions have a mannan content of 1 to 7 mass %, and the binding portion has a mannan content of 1 to 7 mass %; and wherein the binding portion further contains starch, and the fibrous portions do not contain starch.

11. The shrimp-like food according to claim 10, wherein individual fibrous portions have a thickness of 0.8 to 3.0 mm.

12. The shrimp-like food according to claim 10, wherein the fibrous portions have a water content equal to or lower than that of the binding portion.

13. The shrimp-like food according to claim 10, wherein the mass ratio of the fibrous portions to the binding portion in the food is 100:42 to 150.

14. The shrimp-like food according to claim 12, wherein the water content of the fibrous portions is 75 to 95 mass %, and the water content of the binding portion is 75 to 98 mass %.

* * * * *